Sept. 5, 1961 — W. SICHAK ET AL — 2,999,205
FREQUENCY INDICATING SYSTEM
Filed May 16, 1958 — 4 Sheets-Sheet 1

Fig.1

Inventors
WILLIAM SICHAK
ROBERT T. ADAMS
By Alfred C. Hill
Agent

2,999,205
Patented Sept. 5, 1961

2,999,205
FREQUENCY INDICATING SYSTEM
William Sichak, Nutley, and Robert T. Adams, Short Hills, N.J., assignors to International Telephone and Telegraph Corporation, Nutley, N.J., a corporation of Maryland
Filed May 16, 1958, Ser. No. 735,905
20 Claims. (Cl. 324—79)

This invention relates to frequency measuring systems and more particularly to a system for rapidly presenting an indication representative of the frequency of a signal wave of unknown frequency.

One form of frequency measuring system in the prior art employs a standard frequency source coupled to an arrangement of harmonic and subharmonic generators, the outputs of which are coupled to selector-mixing circuits. A known frequency is selected by an operator for beating with the unknown frequency in successive stages until in the last stage a zero beat is obtained. The readings of the various selectors may then be added together to give the analog value of the unknown frequency. Another method employs a plurality of oscillators the frequency of which may be selected for successively mixing with the unknown frequency. As in the first method, the analog value of the unknown frequency is obtained by adding together the frequency settings of the plurality of oscillators. It is obvious that these prior art frequency measuring systems are relatively slow in operation.

It is an object of this invention to provide a system for obtaining an indication representing the frequency of a signal wave which is rapid in operation, typically, in less than two microseconds.

Another object of this invention is to provide a system for obtaining an indication representing the frequency of a signal wave which is completely automatic and accurate within approximately one megacycle in a hundreds of megacycles frequency range.

Still another object of this invention is to provide a system for obtaining an indication representing the frequency of a signal wave which automatically presents the indication representative of the signal wave frequency in digital form.

A feature of this invention is the provision of means for determining which of a plurality of frequency subdivisions of a given frequency range a signal wave is in and providing an output indicative thereof, means for determining which of a plurality of different frequency subdivisions of said first-mentioned frequency subdivisions said signal wave is in and providing an output indicative thereof and a predetermined number of such successive means for determining, each giving an output indicative of the determination. Taken together, the outputs of the means for determining provide the indication representing the frequency of said signal wave.

Another feature of this invention is the provision of a plurality of frequency responsive networks coupled in cascade, the first of said networks being responsive to the frequencies of a given frequency range and the others of said networks being responsive to the frequencies in a frequency range related to said given frequency range by different factors. Each of the networks include a plurality of circuit means to divide the frequency range of said network into a given plurality of continuous frequency segments. The circuit means, except the circuit means providing the first of said frequency segments, include means to translate the frequency segments associated therewith to said first of said frequency segments, the frequency range of said others of said networks being said first of said frequency segments of the preceding one of said networks. There is further provided means coupled to each of said networks to provide an indication which may be digital in form representing the frequency of a signal wave occurring in said given frequency range.

Still another feature of this invention is the provision of means for dividing a given frequency range into a plurality of subdivided frequency ranges, means for translating said subdivided frequency ranges to a first common subdivided frequency range. The first common subdivided frequency range is operated on by means for dividing to produce therefrom another plurality of subdivided frequency ranges which are translated by means for translating to a second common subdivided frequency range. There is then employed a predetermined number of successive means for dividing the common subdivided frequency range of each preceding means into subdivided frequency ranges and translating the subdivided frequency ranges to a common subdivided frequency range. There is further provided means to detect the presence or absence of a signal in each of said subdivided frequency ranges to provide an indication which may be digital in nature representing the frequency of a signal wave occurring in said given frequency range.

A further feature of this invention is the incorporation of a plurality of pass-band filters to provide the dividing of a frequency range into a plurality of subdivided frequency ranges or frequency segments.

Still a further feature of this invention is the employment of a combination of a mixer circuit and an oscillator to bring about the desired translation of subdivided frequency ranges to a common subdivided frequency range. In accordance with the principles of this invention wherein it is desired to achieve one particular type of digital indication, the oscillators associated with even numbered subdivided frequency ranges have their frequency disposed above their subdivided frequency range and the oscillators associated with odd numbered subdivided frequency ranges have their frequency disposed below their corresponding subdivided frequency range.

The above-mentioned and other features and objects of this invention will become more apparent by reference to the following description taken in conjunction with the accompanying drawings, in which.

Figure 1:
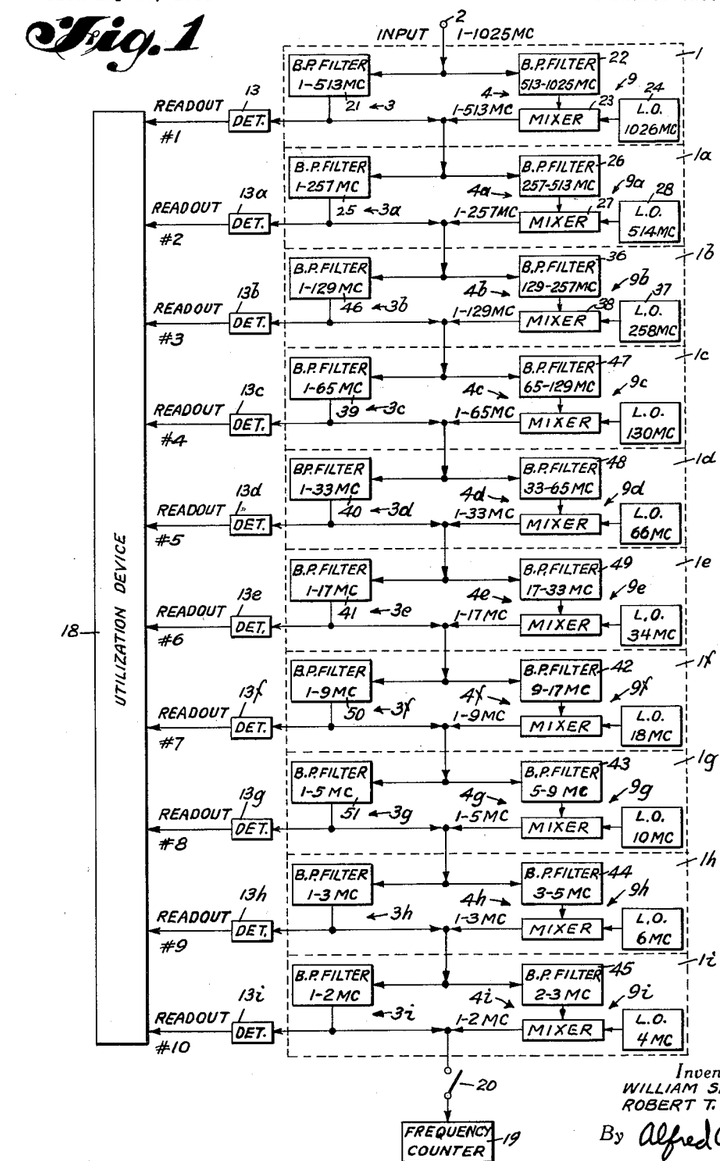
FIG. 1 is a schematic diagram and block form of a frequency indicating system following the principles of this invention.
Figure 3:
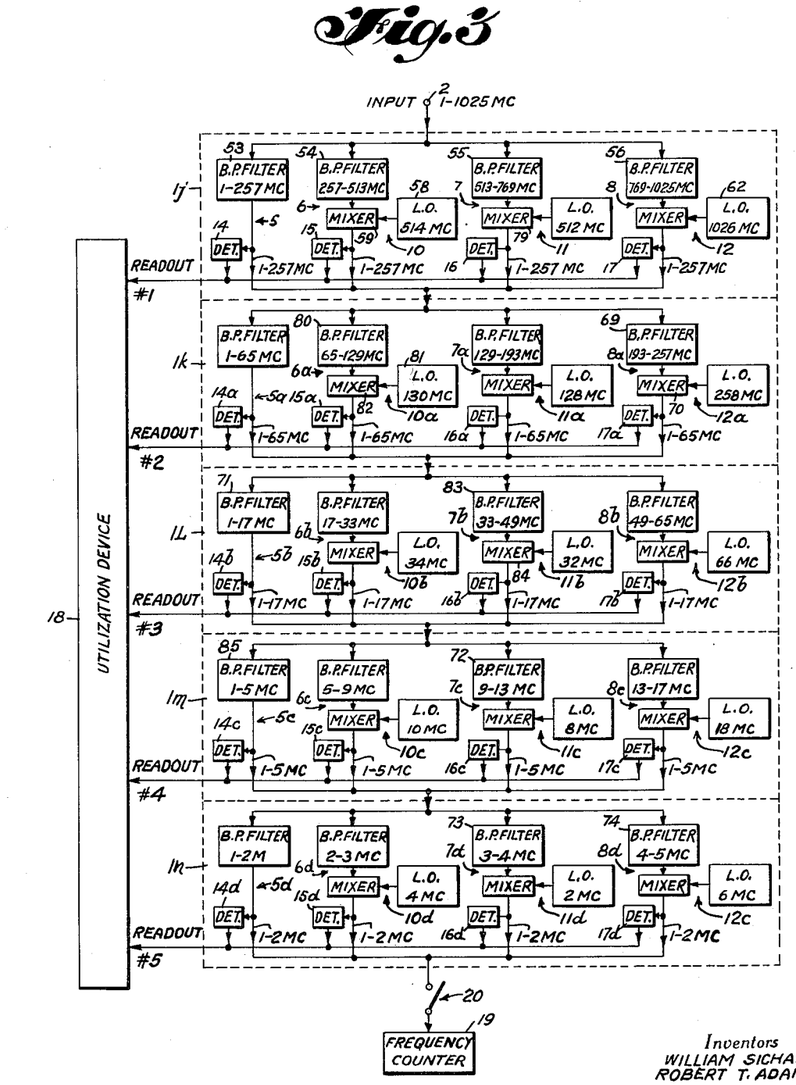
FIG. 3 is a schematic diagram and block form of still another frequency indicating system following the principles of this invention.

Referring to FIGS. 1 and 3, the system in accordance with this invention for obtaining an indication representing the frequency of a signal wave in a given frequency range is generally shown as comprising a plurality of frequency responsive networks 1 coupled in cascade to a signal wave input means 2. The first of the networks, network 1 in the system of FIG. 1 and network 1j in the system of FIG. 3, are responsive to the frequencies of the given frequency range in which the system will operate and the others of the network coupled in cascade to the first network of the system are responsive to frequencies in a frequency range related to the given frequency range by different factors. The frequencies to which the different networks coupled in cascade to the first network of a particular system response and hence the frequency range related to the given frequency range depends upon the numbering base of the digital numbering system employed to obtain the digital indication of the frequency of the signal wave.

Each of networks 1 includes a plurality of circuit means identified in FIG. 1 by the reference characters 3 and 4 and in the circuit of FIG. 3 by the reference characters 5, 6, 7, and 8. The circuit means operate to divide the frequency range of a particular network 1 into a plurality of continuous frequency segments or subdivided frequency ranges. The circuit means of the cascade connected networks, except for the circuit means providing the first of said frequency segments, circuit means 3 of FIG. 1 and circuit means 5 of FIG. 3, include means to translate the frequency segment or subdivided frequency range associated therewith to said first of said frequency segments. The means to translate of FIG. 1 have applied thereto the reference character 9, and the means to translate in FIG. 3 have applied thereto the reference characters 10, 11, and 12. The frequency range of networks 1 other than the first network of each of the systems of FIGS. 1 and 3 is the first of said frequency segments of the preceding one of the networks.

Each of the networks of the systems of FIGS. 1 and 3 have coupled thereto a means to provide an indication representing the frequency of the signal wave applied to input means 2. In FIG. 1 these means are identified as detectors 13 and in FIG. 3 by the detectors 14, 15, 16, and 17. These means to give an indication representing the frequency of the signal wave applied to the input means 2 provided an output which is sequentially coupled to utilization device 18 from which may be obtained the analog value of the frequency of the input signal. Utilization device 18, for instance, may be a storage device in which the information, the presence or absence of a signal wave in a given one of the frequency segments in the systems of FIGS. 1 and 3, may be stored in digital form. This digital information may be stored until such time as it is convenient to translate the digital information to an analog value. The storage device may be film or magnetic tape, and the translation from digital to analog may be accomplished by mathematical operation of an operator or by utilization of known digital to analog converter techniques. The translation from digital to analog information does not form a part of this invention other than to illustrate utility for the frequency indicating system of this invention.

The systems illustrated in FIGS. 1 and 3, which are representative of those systems following the principles of this invention, have use in a reconnissance operation wherein it is desired to obtain an indication of a frequency rapidly, typically, in two microseconds, and it is further desired that this frequency indication be within at least one megacycle of the actual value of the frequency of the unknown signal wave. It is not desired that as the signal is passed through the equipment that the information be given in analog form, since this involves a time consuming operation as represented by the prior art frequency measuring circuits. The digital information is sufficient for the purposes of reconnaisance wherein this digital information may be later translated at leisure to the analog value.

If it is desired to obtain an accuracy of more than one megacycle, say down to one cycle, it would be possible to apply the output of the system of this invention to a frequency counter as indicated at 19 which operates in a conventional manner to obtain the analog or digital measure of the remainder of the signal passing through the frequency indicating system of this invention. The connection to the frequency counter 19 can be made through switch 20.

The components spelled out generally in connection with FIGS. 1 and 3 provide a system for obtaining an indication representing the frequency of a signal wave in a given frequency range which in effect determines which of a plurality of different frequency subdivisions of said given frequency range said signal wave is in and providing an output indicative thereof, the next successive network provides a means for determining which of a plurality of different frequency subdivisions of the first-mentioned frequency subdivisions said signal wave is in and providing an output indicative thereof and a predetermined number of successive means couped thereto provides a means for determining which of a plurality of different frequency subdivisions of the preceding frequency subdivisions said signal wave is in and provides an output indicative thereof. When these outputs are combined in sequence in a storage medium to provide frequency information in digital form, it is possible to obtain at a later date the analog value of the frequency of the signal wave applied to the frequency indicating system of this invention.

Referring more specifically to FIG. 1, there is disclosed therein a system for obtaining an indication representing the frequency of a signal wave applied to input terminal 2 which will provide an indication of the frequency value as a binary number and more particularly as a reflected binary number. In describing the specific operation of FIG. 1, a specific example of frequency ranges will be employed merely for the purposes of explanation and is to be considered in no manner a limitation to the frequency range the system of this invention can handle.

A signal wave of unknown frequency is applied to network 1 from input terminal 2, said signal wave being some place in the frequency range from 1 to 1025 megacycles (mc.). Circuit means 3 of network 1 includes band-pass filter 21 which will pass a signal in half the range of the given input frequency range; in other words, a signal in the range of 1 to 513 mc. will pass through filter 21. Circuit means 4 of network 1 includes a band-pass filter 22 which will permit a signal wave in the range of 513 to 1025 mc. to pass therethrough. In other words, the frequency range of this particular system is divided in half employing band-pass filters 21 and 22. To the output of band-pass filter 22 is coupled a means to translate the signal passing therethrough, said means to translate being identified by the reference character 9 and includes therein a mixer 23 and a local oscillator 24. The cooperation of mixer 23 and oscillator 24, which has a frequency of 1026 mc., inverts and translates the frequency range of band pass filter 22 to the frequency range of band-pass filter 21, the first of the circuit means of network 1 or, in other words, the first subdivided frequency range of network 1. Thus, a signal passing through filter 22 will be inverted and translated to the frequency range of filter 21.

The frequency range of network 1a is then the frequency range of the first means to divide or the frequency range of band-pass filter 21. Network 1a includes in circuit means 3a band-pass filter 25 which operates to pass those signals in the range 1 to 257 mc., and circuit means 4a includes therein band-pass filter 26 which operates to pass signal waves in the frequency range 257 to 513 mc. therethrough. Thus band-pass filters 25 and 26 have divided by two the frequency range of band-pass filter 21, or, in other words, the frequency range of network 1a. The output of band-pass filter 26 is coupled to translation means 9a which includes mixer 27 and local oscillator 28, which has a frequency 514 mc. The cooperation of mixer 27 and local oscillator 28 is to invert and translate the frequency range of band-pass filter 26 to the frequency range of band-pass filter 25 or, in other words, the first subdivided frequency range of network 1a.

This operation of dividing the frequency range of a network by band-pass filters and translating the frequency range of the second half of the frequency range to the lower half of the frequency range in an inverted fashion is carried on in a similar manner by the successive networks 1b to 1i at which point the signal wave is passed through either circuit means 3i or circuit means 4i which will give the final bit of information necessary to obtain an indication in utilization device 18 of the frequency of the signal wave in reflected binary notation. The indication stored in device 18 will be within one megacycle of the true value of the signal wave applied at terminal 2.

Figure 2:
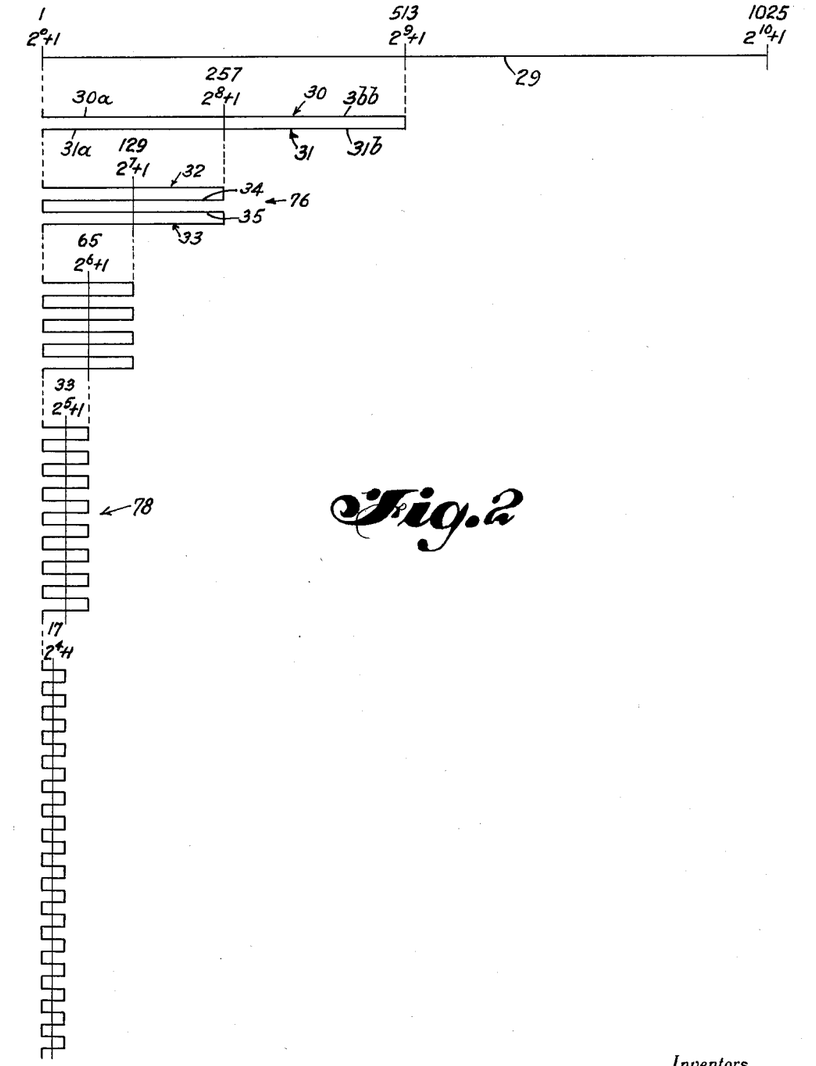
FIG. 2 is an illustration of the operation of the system of FIG. 1.

The operation of circuit means 3 and 4 of networks 1 in the binary system of FIG. 1 is illustrated diagrammatically in FIG. 2. In FIG. 2, line 29 represents the input frequency range of the system and hence the frequency range of network 1, the first network of the system. Line 30 represents the frequency range passed by filter 21 of circuit means 3 which as will be recognized is half the length of line 29. Line 31 represents the output of mixer 23 which represents the frequency range of band-pass filter 22 inverted and translated to the frequency range of circuit means 3. The length of lines 30 and 31 represents the operating frequency range of network 1a which is reacted upon by filters 25 and 26 of network 1a. Line 32 represents the frequency range of filter 25 corresponding to portion 30a of line 30, while line 33 represents the portion of line 31a passed by band-pass filter 25. Lines 34 and 35 represent portions 30b and 31b, respectively, of lines 30 and 31 folded over due to the inversion and translation taking place through the cooperation of mixers 27 and 28. The dividing of the frequency range of a network and the inversion and translation of the upper half of the range to the lower half of the range is pictorially illustrated in FIG. 2 substantially as described above with reference to networks 1 and 1a in conjunction with networks 1b, 1c, 1d.

As stated hereinabove, the combined output of detectors 13 to 13i provide a sequential reflected binary display from which can be obtained an analog value of the signal wave applied to the system of this invention. The production of the digital indication of the frequency of a signal wave is as follows. If the signal wave has a value less than the mid-value of the frequency range of a network, the signal wave passes through circuit means 3, detector 13 will provide a zero output which corresponds to zero in reflected binary notation and if the signal wave has a frequency value greater than the mid-value of the frequency range of a network, the signal wave passes through circuit means 4, detector 13 will provide an output of a given amplitude which corresponds to one in the reflected binary notation. At the same time, the components in circuit means 4 will operate to invert and translate the incoming signal through the cooperation of the mixer and local oscillator contained in circuit means 4.

To further clarify the operation of the system of this invention, an example will be employed. Assume a signal wave is applied to the system of this invention as depicted in FIG. 1 at input terminal 2 having a frequency value of slightly more than 246 mc. A signal having a frequency of 246(+) mc. is less than the mid-value of 513 and hence the signal wave will pass through band-pass filter 21. Detector 13 will recognize the presence of a signal at the output of filter 21 and will thereby provide in reflected binary notation the indication zero. The signal wave 246(+) mc. is also less than the mid-value of the frequency range of network 1a and will flow through band-pass filter 25 which again provide an indication at the output of detector 13a of the reflected binary notation zero. The frequency 246(+) mc. is then coupled to network 1b, and it is observed that frequency 246(+) mc. is greater than the mid-value of the frequency range of network 1b which means that the signal wave will pass through band-pass filter 36. The frequency 246(+) mc. is operated on by the frequency of local oscillator 37, which has a value of 258, in mixer 38 to provide an output therefrom having a frequency of 12(—) mc., since the original frequency was assumed to be 246(+) mc. The operation in circuit means 4b in essence has been to invert the incoming signal by subtraction from the frequency of the local oscillator 37 and translate this frequency signal into the frequency range of the circuit means 3b. Since the signal wave was coupled through band-pass filter 36, detector 13b will recognize the absence of a signal at the output of circuit means 3b and therefore will provide in reflected binary notation an output of one. The frequency signal of 12(—) mc. is applied to network 1c and, since it is less than the mid-value of the frequency network 1c, will pass through band-pass filter 39. An output of band-pass filter 39 provides a reflected binary zero indication at the output of detector 13c.

The frequency signal 12(—) mc. is then coupled to network 1d and, since it is less than the mid-value of the frequency range of network 1b, will be applied through band-pass filter 40, the output therefrom being recognized by detector 13d to provide a zero reflected binary notation. The output from network 1d is then coupled to network 1e and has the value of 12(—) mc. It is recognized by the circuit that this value of frequency will pass through band-pass filter 41 since it is less than the mid-value of the frequency range of network 1e. Again, detector 13e will recognize an output from band-pass filter 1 and the readout will consist of the reflected binary notation zero. The signal wave 12(—) mc. is then coupled to network 1f and has a value greater than the mid-value of the frequency range of network 1f and hence is coupled through band-pass filter 42. The output of band-pass filter 42 is operated on by means to translate 9f to in effect subtract the signal wave from the frequency of the local oscillator, 18 mc., included in means to translate 9f resulting in a signal having a value of 6(+) mc. Detector 13f recognized no output from filter 50 and hence provides at its output a reflected binary notation of one. This signal wave is then applied to network 1g which has a value greater than the mid-value of the frequency range of network 1g and is applied through band-pass filter 43 where again the signal is inverted and translated by the operation of means to translate to the frequency range of circuit means 3g and will have a value of 4(—) mc. Detector 13g will recognize no output from filter circuit means 3g and hence will provide the reflected binary notation one. The resulting signal 4(—) mc. is coupled to network 1h, the 4(—) mc. frequency signal having a value greater than the mid-value of the frequency range of network 1h. This means that the signal will pass through filter 44 wherein it is operated on by translating means 9h to invert and translate the signal to the first subdivided frequency range of network 1h. Detector 13h will recognize the absence of signal from the output of circuit means 3h and hence will provide the binary notation of one. The resultant signal coupled to network 1i has a value 2(+) mc. which is greater than the mid-value of network 1i and hence will pass through filter 45 and hence will be operated on by translating means 9i to translate the signal to the first subdivided frequency range of network 1i. Detector 13i will again provide an indication in reflected binary notation of one. It will be served that the last indication from detector 13i depends upon whether the input signal is less than or greater than 246 mc. In other words, if the signal was slightly less than 246 mc., the last bit of digital information would be zero in reflected binary notation. This is true because the accuracy of the system is to the nearest one megacycle, and hence frequencies from 245 mc. to 246 mc. will be read in this system as 245 mc. and frequencies from 246 mc. to 247 mc. will be read as 246 mc. in reflected binary notation.

The table presented directly below summarizes the operation of the system of FIG. 1 in connection with the example hereinabove employed, namely, an input signal of 246(+) megacycles.

| Network | Signal Condition | Oscillator Frequency | Results of Translation | Detector 13 Output |
|---|---|---|---|---|
| 1 | 246+<513 | | | 0 |
| 1a | 246+<257 | | | 0 |
| 1b | 246+>129 | 258 | 12— | 1 |
| 1c | 12—<65 | | | 0 |
| 1d | 12—<33 | | | 0 |
| 1e | 12—<17 | | | 0 |
| 1f | 12—>9 | 18 | 6+ | 1 |
| 1g | 6+>5 | 10 | 4— | 1 |
| 1h | 4—>3 | 6 | 2+ | 1 |
| 1i | 2+>2 | 4 | 2— | 1 |

The outputs of detectors 13 of FIG. 1 will hence provide in device 18 in reflected binary notation the following indication, which may be translated and read as shown:

Weighted values = (512) (256) (128) (64) (32) (16) (8) (4) (2) (1)

Frequency indication = 0  0  1  0  0  0  1  1  1  1
(reflected code)

Equivalent binary = 0  0  1  1  1  1  0  1  0  1
code

Analog indication = 0 + 0 + 128 + 64 + 32 + 16 + 0 + 4 + 0 + 1 = 245 mc.

Actual frequency = Analog indication (indicated frequency) + 1   = 246 mc.

As depicted hereinabove, the bits of information or digits of the coded information are given weights, analog indication, in accordance with the normal binary practice. It is to be remembered that the resulting indication at the output of the system of FIG. 1 is a reflected binary-type indication. Hence to convert to an analog value, applicants prefer to employ the following arrangement. If an even number of ones appear to the left of a bit of information in the original reflected code, the weighted value is read directly. If the number of ones to the left of the digit is odd, reverse the meaning of the digit. Hence read one for zero and zero for one. This will enable a quick and easy way for an operator to convert the stored digital indication of a frequency to an analog value by adding the weighted values of the digits after the above indicated shift is made. To the results achieved by the translation from reflected binary to analog, the value one megacycle is added to the results. This is necessary since the original frequency range is raised by one, that is, a range of 1–1025 mc. rather than 0–1024 mc. The adding of one to the results obtained from the system permits additional digits for reading fractions of megacycles. If readings to the nearest whole megacycle are desired, 1.5 mc. should be added to the calculated frequency instead of the even 1 mc. thus enabling the rounding off to the nearest .5 mc. Thus, the error becomes ±0.5 mc. instead of +0, —1 mc.

To further illustrate the operation of the system illustrated in FIG. 1, let us assume another frequency value and run through the operation of the circuit again. Assume the input frequency signal is 606 mc. This signal is applied through terminal 2 to network 1, and it is observed that 606 mc. is greater than the mid-value of the frequency range of network 1 and hence will pass through band-pass filter 22 and be translated and inverted by operation of translation means 9. The detector 13 will recognize the absence of an output from filter 21 and hence will provide a reflected binary notation one. In the process of translating in network 1, the signal wave has been translated to frequency 420 mc. which is hence coupled to network 1a wherein again it is greater than the mid-value of the frequency range of network 1a and will pass through band-pass filter 26, the output of which is inverted and translated by the operation of translation means 9a to provide a resultant translated signal having a frequency value 94 mc. Detector 13a will provide a reflected binary output of one. The translated signal is then fed into network 1b wherein it is recognized that 94 mc. is less than 129 mc., the mid-value of the frequency range of network 1b, and hence will be passed through band-pass filter 46, the output of which will be recognized by detector 13b and will produce in the utilization device the reflected binary notation zero. The output of network 1b is fed to network 1c, and since the signal 94 mc. is greater than the mid-value of the frequency range of network 1c, it will pass through band-pass filter 47, the output of which is translated an inverted by translation means 9c. Detector 13c will recognize the absence of an output from filter 39 and will supply the reflected binary notation one. In the process of translation, the signal 94 mc. has been translated to the signal having a frequency 36 mc. which when applied to network 1d is recognized as being larger than the mid-value of the frequency range of network 1d and hence will pass through band-pass filter 48, the output of which is inverted and translated by the operation of translation means 9d. Again, detector 13d will recognize no output from filter 40 and hence will supply the reflected binary notation one to the utilization device 18. Due to the process of translation, the frequency of the signal coupled to network 1e has a value of 30 mc. which is larger than the mid-value of the frequency range of network 1e and will be passed through band-pass filter 49, the output of which is translated by translation means 9e and inverted in the operation thereof. Detector 13e will recognize no output from filter 41 and hence the reflected binary notation one is supplied. In the translation in circuit 1e, the resultant frequency of the signal has a value of 4 mc. which is recognized to be less than 9 mc., the mid-value of the frequency range of network 1f and hence will pass through band-pass filter 50. An output from band-pass filters is recognized by detector 13f which will supply the reflected binary notation zero. The 4 mc. signal will then be coupled to network 1g, and since it has a value less than the mid-value of the frequency range of network 1g will be passed through band-pass filter 51, an output from which is recognized by detector 13g and will supply a reflected binary notation zero. The 4 mc. signal is then coupled to network 1h which is greater than the mid-value of the frequency range of the network 1h and will pass through band-pass filter 44. The output of filter 44 will be translated by translation means 9h to a value of 2 mc. Detector 13h will provide a reflected binary output one to the utilization device 18. The output of network 1h is then coupled to the network 1i wherein if the original signal was slightly greater than 606 mc. will pass through band-pass filter 45 and be translated by translation means 9i, the detector 13i giving a deflected binary notation of one. It is to be remembered, however, that this is the bit of information which is in doubt and provides the accuracy limitation of the system. If the original input signal is less than 606 mc., the signal applied to network 1i will pass through circuit means 3i and the resultant reflected binary notation will be zero. This of course would result in a one-megacycle error. If the input signal is exactly 606 mc., the last bit of information supplied by network 1i could be in confusion but the end result would be no further off than one megacycle. Let us now tabulate the operation of the system of FIG. 1 using the present example and then illustrate the translation to an analog value.

| Network | Signal Condition | Oscillator Frequency | Results of Translation | Detector 13 Output |
|---|---|---|---|---|
| 1 | 606+>513 | 1,026 | 420− | 1 |
| 1a | 420−>257 | 514 | 94+ | 1 |
| 1b | 94+<129 | | | 0 |
| 1c | 94+>65 | 130 | 36− | 1 |
| 1d | 36−>33 | 66 | 20+ | 1 |
| 1e | 30+>17 | 34 | 4− | 1 |
| 1f | 4−<9 | | | 0 |
| 1g | 4−<5 | | | 0 |
| 1h | 4−>3 | 6 | 2+ | 1 |
| 1i | 2+>2 | 4 | 2− | 1 |

The outputs of detectors 13 of FIG. 1 will hence provide in device 18, in reflected binary notation, the following indication, which may be translated and read as shown:

Weighted values    = (512) (256) (128) (64) (32) (16) (8) (4) (2) (1)

Frequency indication = 1  1  0  1  1  1  0  0  1  1
(reflected code)

Equivalent binary  = 1  0  0  1  0  1  1  1  0  1
code

Analog indication  = 512 + 0 + 0 + 64 + 0 + 16 + 8 + 4 + 0 + 1 = 605 mc.

Actual frequency = Analog indication (indicated frequency)  + 1        = 606 mc.

Now as before weights, figures in parentheses, are assigned to these various bits of information and the translation from the inverted binary to analog is accomplished by remembering that reading successively from the left, if the number of ones to the left of the digit being read is even, the digit is read directly and the value assigned thereto is included for addition to achieve the final result. However, if the number of ones to the left of the digit being read is odd, the meaning of the digit is reversed and the weighted value is applied as the new digit dictates.

The description of the operation of FIG. 1 illustrates that the indicating system of this invention may readily be employed to obtain a reflected binary-type digital indication of the frequency of a signal applied thereto, the resultant indications at the readouts being stored and then manually translated by an operator at a later time, or are employed in an electrical or mechanical arrangement to translate from digital to analog formation. It is to be remembered, however, that the inventive portion of this invention is not concerned with the translation from the digital information to the analog value but is concerned with the manner in which the digital indication of the frequency of the signal wave applied to the equipment is achieved. It is to be further remembered that the system of this invention is not limited to obtaining an indication in binary notation as will be hereinafter pointed out with respect to the system of FIG. 3 which illustrates how an indication of a frequency of a signal wave can be obtained in quaternary digital notation and then operated on manually to translate from this quaternary indication to an analog value. It is to be understood that the system of this invention may be modified in accordance with known techniques and the techniques herein described to produce an indication at the output of our system any type of digital indication whether it be in a numbering system of three, five, and so forth.

Figure 4:
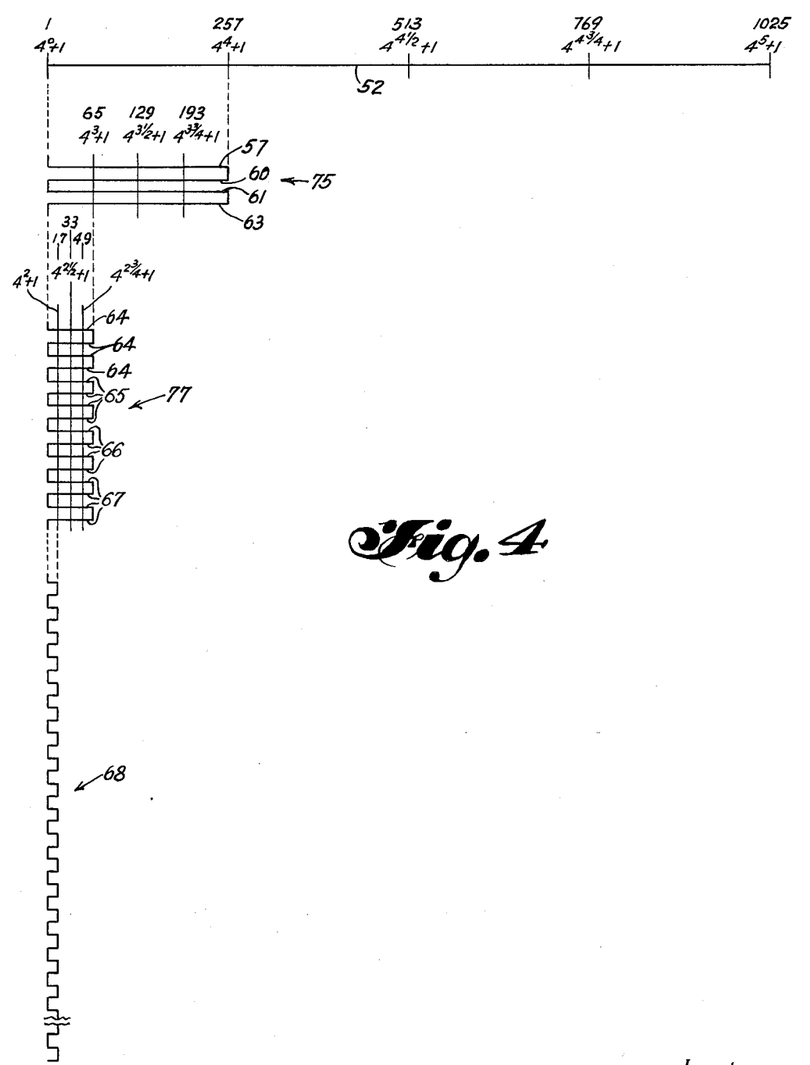
FIG. 4 is an illustration representing the operation of the circuit of FIG. 3.

Referring to FIG. 3, a quaternary system employing the principles of this invention is illustrated. In the quaternary system the networks 1j to 1n include four circuit means to divide the frequency range of the networks into four frequency segments or subdivisions with the succeeding network operating on the first frequency segment of the preceding network to continuously divide and translate the frequency segments in the cascade connected networks. In the following description of FIG. 3, reference will be made to the curves of FIG. 4 to facilitate an understanding of the operation of the quaternary indicating system. The frequency range of the system is represented in FIG. 4 by line 52 which is divided into four frequency segments or subdivisions by incorporating band-pass filters 53, 54, 55, and 56, each having appropriate frequency ranges to accomplish the division of the frequency range of network 1j. As in the binary system of FIG. 1, the first circuit means 5 does not provide any translation of the signal; rather it provides the first frequency segment of the division taking place in networks 1j. The circuit means 6, 7, and 8 include therein local oscillators and mixers to accomplish the desired translation to effect the translation of their respective frequency segment to the first frequency segment established by circuit means 5. Referring again to FIG. 4, it will be observed that band-pass filter 53 has a frequency range represented by line 57. Due to the value of frequency of local oscillator 58 which is above the frequency range of filter 5, the frequency range of band-pass filter 54 is inverted and translated through a subtraction process which takes place in mixer 59 and is represented by line 60 of FIG. 4. The translation which takes place in circuit means 7 is one of normal translation with no inversion, and this is brought about by the positioning of the local oscillator frequency below the frequency range of band-pass filter 55. This translation is illustrated by line 61 of FIG. 4. The translation which takes place in circuit means 8 is one which translates and inverts the frequency range of filter 56 by positioning the frequency of local oscillator 62 above the frequency range of the circuit means 8 and hence is represented by line 63 of FIG. 4. It will be observed that in each of networks 1j to 1n that the local oscillator coupled to the even-numbered band-pass filters, such as band-pass filters 54 and 56 of network 1j, have the frequency of the local oscillator disposed above the frequency range of the circuit means, while the odd-numbered band-pass filters, such as filter 55, have the local oscillator frequency disposed below the frequency range of the circuit means. A general statement may be stated that in the translation process the even-numbered circuit means will include a local oscillator whose frequency is disposed above the frequency range of the circuit means to provide the translation and inversion of the frequency range of that particular circuit means, while the even-numbered circuit means will include a local oscillator whose frequency has a value which is disposed below the frequency range of the circuit means and hence will provide normal translation without inversion. This is not a general statement for only a quaternary system taught in this invention but may be applied to all systems of this invention employing digital information related to other numbering bases.

Since the system illustrated in FIG. 3 is a quaternary system, it is necessary that each of the networks have a detecting arrangement which can give a bit of information having four levels rather than the two bits of information present in a binary system. For instance, an output detected by detector 14 could be arranged to provide an indication representing a first digital state, while an output detected by detector 15 would produce an indication representing a second digital state, and an output detected by detector 16 would result in an indication representing a third digital state and, in turn, an output detected by detector 17 would produce an indication representing a fourth digital state. It is then possible to assign the values of zero to an output from detector 14, a value of one from an output of detector 15, a value of two from an output of detector 16, and a value of three from an output of detector 17 and from this information carry on a further operation to be hereinbelow described to convert the quaternary digital information or notation into reflected binary and hence into an analog value. While this is one scheme that can be used, that of having the detectors produce one state of output and assigning a notation thereto for conversion, there are other schemes that will be immediately obvious to those skilled in the art.

It may be generally stated about all the networks in a quaternary system that if the frequency of the signal wave is less than one quarter of the value of the frequency range, the detector 14 output would be representative of the digital notation zero; if the frequency is greater than one quarter but less than one half the value of the frequency range, the detector 15 output would be representative of the digital notation one and the incoming signal would be translated and inverted to the lowest frequency range by the subtraction process taking place in the mixer of the circuit means and the positioning of the frequency of the local oscillator. If the frequency is greater than one half and less than three quarters the value of the frequency range of the network, an output representative of the digital notation two would be produced by detector 16 and the incoming signal would be normally translated without inversion to the lowest frequency range through the operation of the mixer and the disposition of the frequency of the local oscillator with respect to the frequency range of the circuit means, while if the frequency is greater than three quarters but less than one of the frequency range of the network, an output representative of the digital notation three would be produced from detector 17 and the incoming signal would be inverted and translated to the lowest frequency range of the network through the cooperation of the mixer and the disposition of the frequency of the local oscillator in the circuit means. These are the general conditions that take place in networks 1j to 1n of the system illustrated in FIG. 3 which provides quaternary digital information of the frequency of a signal wave.

To carry on with the description of the operation of the networks of the quaternary system with reference to the curves of FIG. 4, the frequency range of circuit means 5, 6, 7 and 8 of network 1j is divided by the operation of the circuit means in network 1k in four as depicted. Hence band-pass filter of circuit means 5a would pass the first frequency segment and is represented by lines 64 of FIG. 4. These lines 64 correspond to the portions of lines 57, 60, 61, and 63 in the range 1 to 65 mc. of the preceding network. The band-pass filter of circuit means 6a passes the frequency range of 65 to 169 mc. and through the operation of the local oscillator and mixer in translating means 10a translates this frequency range through inversion to the first frequency segment of the network, and this is illustrated by lines 65 in FIG. 4. These lines 65 correspond to that portion of lines 57, 60, 61, and 63 between the frequency range 65 to 129 mc. The band-pass filter of circuit means 7a passes the frequency range 129 to 193 mc. and through the cooperation of the translating means 11a translates this frequency range without inversion to the first frequency segment of network 1k, and this is depicted by lines 66 in FIG. 4. These lines 66 correspond to those portions of lines 57, 60, 61, and 63 in the frequency range 129 to 193 mc. Circuit means 8a passes through the filter therein the frequency range 193 to 257 mc. and through the cooperation of translating means 12a translates and inverts this frequency range to the first frequency range of the network, this translation being depicted by lines 67 in FIG. 4. Lines 67 in FIG. 4 correspond to those portions of lines 57, 60, 61, and 63 in the frequency range 193 to 257 mc. The detectors 14a, 15a, 16a, 17a would indicate the presence or absence of a signal in the particular circuit means associated therewith and provide an output representing the digital notation or indication assigned thereto and hence corresponding to the particular range of frequency the signal passes through. This process of dividing the first frequency segment of the preceding network by the succeeding network and translating the frequency range of the circuit means except the first to the first frequency segment is continued a predetermined number of times until the desired accuracy of frequency indication of signal wave having an unknown frequency is achieved. The components of these remaining predetermined networks, such as networks 1L, 1m and 1n, are the same as the two previously described. The divison and translation which takes place in network 1L is shown in part by the curve 68 in FIG. 4. The division and translation taking place in networks 1m and 1n have not been illustrated in FIG. 4 for simplication thereof.

It will be observed that curve 75 of FIG. 4 is identical with curve 76 to FIG. 2 and that curve 77 of FIG. 4 is identical with curve 78 of FIG. 2. It is thus observed that the digital output of the quaternary system is identical with that of the binary information except that the information is obtained two at a time in the quaternary as compared with that in the binary.

To facilitate the understanding of the operation of the quaternary system illustrated in FIG. 3, it is intended to run through an example using a signal having a particular frequency. An example employing the same frequencies as were employed in connection with FIG. 1 will be given.

Assume that a signal wave having a frequency of 246(+) mc. is applied to input terminal 2. 246(+) mc. is less than 257 mc. and greater than 1 mc.; hence the signal wave will pass through band-pass filter 53. Detector 14 will provide an output indicative of a signal wave passing through this filter, representing the digital notation zero. The signal wave will be passed to network 1k without translation. Network 1k will note that 246 mc. is greater than 193 mc. and less than 257 mc. and hence will pass the signal through band-pass filter 69. The frequency of the output of filter 69 will be subtracted from the local oscillator frequency 258 mc. in mixer 70 for translation with inversion to the first frequency segment of network 1k and will result in a value of 12 mc. Detector 17a will provide an output indicative of a signal passing through circuit means 8a, representing the digital notation three, for utilization device 18. The signal having a value of 12 mc. is passed to network 1L wherein it is noted that it is greater than 1 mc. and less than 17 mc. and hence will pass through band-pass filter 71 without translation. Detector 14b will provide an output indicative of a signal passing through circuit means 5b, representing the digital notation zero, to utilization device 18. The signal wave having a frequency of 12 mc. is then passed to network 1m wherein it will pass through filter 72, since the signal frequency is greater than 9 mc. and less than 13 mc. The frequency of the local oscillator having a value of 8 mc. will be subtracted from the signal wave frequency of 12 mc. and hence normally translated without inversion to the first frequency segment of network 1m resulting in a signal wave for application to the succeeding network having a frequency of 4 mc. Detector 16c will produce an output indicative of a signal passing through circuit means 7c, representing the digital notation two. The signal wave now having a frequency of 4 mc. is passed to network 1n wherein it is noted that the signal could pass through either band-pass filter 73 or band-pass filter 74. Since originally it was assumed that the input signal was greater than 246, the signal applied to network 1n will be less than 4 and hence will pass through band-pass filter 73. The frequency of the local oscillator having a value of 2 will be subtracted from the signal wave and the remainder at the output of the mixer may be passed if desired to the frequency counter 19 to reduce the error present in the frequency indication. Detector 16d will produce an output indicative of a signal passing through circuit means 7d which in accordance with the criteria herein set down will be representative of the digital notation two.

Directly below is presented a table summarizing the operation of the system of FIG. 3 in the above example.

| Network | Signal Condition | Oscillator Frequency | Results of Translation | Detector Digital Indication |
|---|---|---|---|---|
| 1j | 246+<257>1 | | | 0 |
| 1k | 246+>193<257 | 258 | 12− | 3 |
| 1L | 12−<17>1 | | | 0 |
| 1m | 12−<13>9 | 8 | 4− | 2 |
| 1n | 4−<4>3 | 2 | 2− | 2 |

The quaternary information applied from appropriate detectors to the utilization devices 18 which the operator is confronted with when it is desired to translate to an analog will be as follows: 03022. This quaternary coded indication of the frequency of the signal applied to terminal 2 can be readily translated to an analog value by assigning to the various indications of the detectors the following values:

$$0 = 00$$
$$1 = 01$$
$$2 = 11$$
$$3 = 10$$

The assigning of these values to the quaternary notation automatically will translate the quaternary information to a reflected binary information and will result in the example herein employed a reflected binary notation of 0010001111. Now operating as we did in the case of the example set forth with respect to FIG. 1 and as hereinbelow illustrated, weights are assigned to the various digital information now in reflected binary notation and the process of translating to an analog may be accomplished by remembering that the digits are read successively from the left and that if the number of ones to the left of the digit being read is even, the weighted value is applied directly. If, however, the number of ones to the left of the digit being read is odd, the digit has the reverse meaning, that is, one is read for zero and zero is read for one. The appropriate operation can be followed through as follows:

```
Frequency indication=     0         3          0          2       2
  (quaternary)
Weighted values     =(512)  (256)  (128)  (64)  (32)  (16)  (8)  (4)  (2)  (1)
Reflected binary    =  0      0      1      0     0     0    1    1    1    1
Equivalent binary   =  0      0      1      1     1     1    0    1    0    1
Analog indication   =  0  +   0  + 128 +   64 +  32 +  16 +  0 +  4 +  0 +  1  = 245 mc.
Actual frequency = Analog indication (indicated frequency)     + 1             = 246 mc.
```

Hence we arrive at the value of 245 as we did in the case of the binary system. To this we add the value of 1 mc. and obtain an answer of 246. As in the case with the discussion given hereinabove with respect to the binary system, the last digit may be either a zero or a one or in the case of the quaternary may be either a two or a three, and hence frequencies from 245 mc. to 246 mc. will be read as 245 mc. and from 246 mc. to 247 mc. will be read as 246 mc. giving us the acuracy to which this system will operate.

It must be remembered that it has been stated herein that the detectors coupled to each of the circuit means provide a particular output if a signal is present in that particular circuit means. For instance, it has been stated that the detector of the first circuit means 5 gives an indication of digital notation zero; the detector associated with circuit means 6 gives an indication of digital notation one; the detector coupled with circuit means 7 gives an indication of digital notation two; and the detector associated with circuit means 8 gives an indication of digital notation three. The operator then applies to these values the notations outlined hereinabove to convert these quaternary notations to reflected binary notations. It is possible and well within one skilled in the art to provide detectors associated with the various circuit means to provide directly the reflected binary output. Hence, it will be necessary for the operator then to only translate manually from the reflected binary notation to the analog value without the intermediate step of manually translating from quaternary to reflected binary notation.

Now let us turn to the second example employed in connection with FIG. 1. At the input of terminal 2 there is applied a signal wave having a value of 606(+) mc. The signal wave of 606(+) mc. will pass through band-pass filter 55 since it is greater than 513 and less than 769 megacycles. This signal wave has subtracted from it the local oscillator frequency of 512 mc. and provides a signal wave of 94 mc. at the output of mixer 79 which will be detected by detector 16 and hence will apply an output indicating the digital notation two to the first readout for application to utilization device 18. The signal of 94 mc. is coupled to network 1k and will pass through band-pass filter 80, since this frequency is greater than 65 mc. and less than 129 mc., which will be subtracted from the frequency of the local oscillator 81 in mixer 82 to provide an output therefrom of 36 mc. Detector 15a will of course detect the presence of a signal in circuit means 6a and will apply an output to utilization device 18 indicating the digital notation one. The 36 mc. signal is coupled to network 1L wherein it will pass through band-pass filter 83 since it has a value greater than 33 mc. and less than 49 mc. The frequency of the signal wave will be subtracted from the local oscillator frequency, 32 mc., in mixer 84 to provide a normally translated signal wave of 4 mc. Detector 16b will observe the presence of a signal at the output of mixer 84 and hence will supply an indication to utilization device 18 representing the digital notation two. The output of mixer 84 is coupled to network 1m and will pass through band-pass filter 85 since the 4 mc. signal is greater than 1 mc. and less than 5 mc., the band width of band-pass filter 85. No translation will take place in circuit means 5c, since this is the first frequency segment of the network 1m. Detector 14c will observe the presence of a signal at the output of filter 85 and will supply an output to utilization device 18 representing the digital notation zero. The 4 mc. signal will then be coupled to network 1n wherein it will pass through either filter 73 or 74. However, remembering that the original signal was 606(+), the signal applied to network 1n will be 4(−) mc. due to the translation processes in the preceding networks. Hence, the signal wave having a value of 4(−) mc. will pass through filter 73 and have subtracted therefrom the frequency of the local oscillator of circuit means 7d. Detector 16d will recognize the presence of a signal at the output of circuit means 7d and hence will supply an output to utilization device 18 representing the digital notation two.

Again employing a table, the operation of the system of FIG. 3 is hereinbelow summarized for the example outlined hereinabove.

| Network | Condition of Signal | Oscillator Frequency | Translation | Detector Output | |
|---|---|---|---|---|---|
| 1j | 606+>513<769 | 512 | 94+ | | 2 |
| 1k | 94+>65<129 | 130 | 36− | | 1 |
| 1L | 36−>33<49 | 32 | 4− | | 2 |
| 1m | 4−>1<5 | | | | 0 |
| 1n | 4−>3<4 | 2 | 2− | | 2 |

When the operator is called upon to translate this quaternary indication of the frequency of the input signal wave, he will have in front of him a quaternary code as follows: 21202. Again, employing the quaternary notation to the binary notations set forth hereinabove, the operator would then translate the quaternary coded indication as follows:

Frequency indication= 2  1  2  1  2
(quaternary)

Weighted values = (512) (256) (128) (64) (32) (16) (8) (4) (2) (1)

Reflected binary = 1  1  0  1  1  1  0  0  1  1

Equivalent binary = 1  0  0  1  0  1  1  1  0  1

Analog indication = 512 + 0 + 0 + 64 + 0 + 16 + 8 + 4 + 0 + 1 = 605 mc.

Actual frequency = Analog indication (indicated frequency) + 1 = 606 mc.

As observed above, the weights of the various digits have been applied above the coded information and the criteria set forth hereinabove the reversal of the meaning of the indicated digits to translate the reflected binary to an analog value has been employed. To the value arrived at in this conversion process, there is added one megacycle to provide us with an indication that the signal wave applied to input terminal 2 had a value of 606 megacycles.

While we have described above the principles of our invention in connection with specific apparatus, it is to be clearly understood that this description is made only by way of example and not as a limitation to the scope of our invention as set forth in the objects thereof and in the accompanying claims.

We claim:

1. A system for obtaining an indication representing the frequency of a signal wave in a given frequency range comprising a signal wave input, a first plurality of means coupled to said signal wave input for determining which of a plurality of different frequency subdivisions of said given frequency range said signal wave is in and providing an output indicative thereof, a second plurality of means coupled to the output of said first plurality of means for determining which of a plurality of different frequency subdivisions of said first-mentioned frequency subdivisions said signal wave is in and providing an output indicative thereof, and a predetermined number of successive plurality of means for determining which of a plurality of different frequency subdivisions of the preceding frequency subdivisions said signal wave is in and providing an output indicative thereof.

2. A system for obtaining an indication representing the frequency of a signal wave in a given frequency range comprising a signal wave input, a first plurality of means coupled to said signal wave input for determining which of a plurality of different frequency subdivisions of said given frequency range said signal wave is in and providing a digital output indicative thereof, a second plurality of means coupled to the output of said first plurality of means for determining which of a plurality of different frequency subdivisions of said first-mentioned frequency subdivisions said signal wave is in and providing a digital output indicative thereof, and a predetermined number of successive plurality of means for determining which of a plurality of different frequency subdivisions of the preceding frequency subdivisions said signal wave is in and providing a digital output indicative thereof.

3. A system for obtaining an indication representing the frequency of a signal wave in a given frequency range comprising a signal wave input, a first plurality of means coupled to said signal wave input for determining which half of said given frequency range said signal wave is in and providing a digital output indicative thereof, a second plurality of means coupled to the output of said first plurality of means for determining which half of said first-mentioned halves said signal wave is in and providing a digital output indicative thereof, and a predetermined number of successive plurality of means for determining which half of the preceding halves said signal wave is in and providing a digital output indicative thereof.

4. A system for obtaining an indication representing the frequency of a signal wave in a given frequency range comprising a signal wave input, a first plurality of means coupled to said signal wave input for determining which quarter of said given frequency range said signal wave is in and providing a digital output indicative thereof, a second plurality of means coupled to the output of said first plurality of means for determining which quarter of said first-mentioned quarters said signal wave is in and providing a digital output indicative thereof, and a predetermined number of successive plurality of means for determining which quarter of the preceding quarters said signal wave is in and providing a digital output indicative thereof.

5. A system for obtaining an indication representing the frequency of a signal wave in a given frequency range comprising a signal wave input, means for dividing said frequency range into a plurality of subdivided frequency ranges, means for translating said subdivided frequency ranges to a first common subdivided frequency range, means for dividing said first common subdivided frequency range into a plurality of subdivided frequency ranges, means for translating said last-mentioned subdivided frequency ranges to a second common subdivided frequency range, a predetermined number of successive means for dividing the common subdivided frequency range of each preceding means into subdivided frequency ranges and translating the subdivided frequency ranges to a common subdivided frequency range, and means for detecting the presence or absence of said signal wave in each of said subdivided frequency ranges to provide an indication representing the frequency of said signal wave.

6. A system for obtaining an indication representing the frequency of a signal wave in a given frequency range comprising a signal wave input, means for dividing said frequency range into a plurality of subdivided frequency ranges, means for translating said subdivided frequency ranges to a first common subdivided frequency range, means for dividing said first common subdivided frequency range into a plurality of subdivided frequency ranges, means for translating said last-mentioned subdivided frequency ranges to a second common subdivided frequency range, a predetermined number of successive means for dividing the common subdivided frequency range of each preceding means into subdivided frequency ranges and translating the subdivided frequency ranges to a common subdivided frequency range, and means for detecting the presence or absence of said signal wave in each of said subdivided frequency ranges to provide a digital indication representing the frequency of said signal wave.

7. A system for obtaining an indication representing the frequency of a signal wave in a given frequency range comprising a signal wave input, first means for dividing said frequency range into first and second subdivided frequency ranges, first means for translating said second subdivided frequency range to said first subdivided frequency range, second means for dividing said first subdivided frequency ranges of said first means for dividing into third and fourth subdivided frequency ranges, second means for translating said fourth subdivided frequency range to said third subdivided frequency range, a predetermined number of successive means for dividing one of the subdivided frequency ranges of each preceding means for dividing into two subdivided frequency ranges and translating one of the two subdivided frequency ranges to the other subdivided frequency range, and means for detecting the presence or absence of said signal wave in each of said subdivided frequency ranges to provide a digital indication representing the frequency of said signal wave.

8. A system for obtaining an indication representing the frequency of a signal wave in a given frequency range comprising a signal wave input, first means for dividing said frequency range into first, second, third and fourth subdivided frequency ranges, first means for translating said second, third and fourth subdivided frequency ranges to said first subdivided frequency range, second means for dividing said first subdivided frequency range of said first means for dividing into fifth, sixth, seventh and eighth subdivided frequency ranges, second means for translating said sixth, seventh and eighth subdivided frequency ranges to said fifth subdivided frequency range, a predetermined number of successive means for dividing one of the subdivided frequency ranges of each preceding means for dividing into four subdivided frequency ranges and translating three of the four subdivided frequency ranges to one of the four subdivided frequency ranges, and means for detecting the presence or absence of said signal wave in each of said subdivided frequency ranges to provide a digital indication representing the frequency of said signal wave.

9. A system for obtaining an indication representing the frequency of a signal wave in a given frequency range comprising a signal wave input, a first plurality of means for dividing said frequency range into a plurality of subdivided frequency ranges, heterodyning means coupled to all but one of said first plurality of means for dividing for translating their associated subdivided frequency range to the subdivided frequency range of said one of said first plurality of means for dividing, a second plurality of means for dividing the subdivided frequency range of said one of said first plurality of means for dividing into a second plurality of subdivided frequency ranges, heterodyning means coupled to all but one of said plurality of second means for dividing for translating their associated subdivided frequency range to the subdivided frequency range of said one of said second plurality of means for dividing, a predetermined number of successive plurality of means for dividing the subdivided frequency range of one of the subdivided frequency ranges of each preceding plurality of means for dividing, and heterodyning means coupled to all but one of the plurality of means for dividing for translating their associated subdivided frequency range to one of the subdivided frequency ranges, and means for detecting the presence or absence of said signal wave in each of said subdivided frequency ranges to provide a digital indication representing the frequency of said signal wave.

10. A system for obtaining an indication representing the frequency of a signal wave in a given frequency range comprising a signal wave input, a first plurality of band-pass filters for dividing said frequency range into a plurality of subdivided frequency ranges, heterodyning means coupled to all but the first of said first plurality of band-pass filters for translating their associated subdivided frequency range to the subdivided frequency range of said first of said first plurality of band-pass filters, a second plurality of band-pass filters for dividing the subdivided frequency range of said first of said first plurality of band-pass filters into a plurality of subdivided frequency ranges, heterodyning means coupled to all but the first of said second plurality of band-pass filters for translating their associated subdivided frequency ranges to the subdivided frequency range of said first of said second plurality of band-pass filters, a predetermined number of successive plurality of band-pass filters for dividing the subdivided frequency range of the first of the subdivided frequency ranges of each preceding plurality of band-pass filters and heterodyning means coupled to all but the first of the plurality of band-pass filters for translating their associated subdivided frequency range to the first of the subdivided frequency ranges, and means for detecting the presence or absence of said signal wave in each of said subdivided frequency ranges to provide a digital indication representing the frequency of said signal wave.

11. A system for obtaining an indication representing the frequency of a signal wave in a given frequency range comprising a signal wave input, a first plurality of band-pass filters for dividing said frequency range into a plurality of subdivided frequency ranges, translating means coupled to all but one of said first plurality of band-pass filters for translating their associated subdivided frequency range to the subdivided frequency range of said one of said first plurality of band-pass filters, a second plurality of band-pass filters for dividing the subdivided frequency range of said one of said first plurality of band-pass filters into a plurality of subdivided frequency ranges, translating means coupled to all but one of said second plurality of band-pass filters for translating their associated subdivided frequency range to the subdivided frequency range of said one of said second plurality of band-pass filters, a predetermined number of successive pluralities of band-pass filters for dividing the subdivided frequency range of one of the subdivided frequency ranges of each preceding plurality of band-pass filters and translating means coupled to all but one of the plurality of band-pass filters for translating their associated subdivided frequency range to one of the subdivided frequency ranges, and means for detecting the presence or absence of said signal wave in each of said subdivided frequency ranges to provide a digital indication representing the frequency of said signal wave.

12. A system for obtaining an indication representing the frequency of a signal wave in a given frequency range comprising a signal wave input, a first plurality of band-pass filters to divide said given frequency range into a first plurality of subdivided frequency ranges, a mixer circuit coupled to each of said first plurality of band-pass filters starting with the second of said first plurality of band-pass filters, an oscillator coupled to each of said mixer circuits, the frequency of the odd-numbered oscillators being disposed above its associated subdivided frequency range and the frequency of the even-numbered oscillators being disposed below its associated subdivided frequency range, each of the mixer circuit and oscillator coupled to a band-pass filter cooperating to translate their associated subdivided frequency range to the first of said first plurality of subdivided frequency ranges, a second plurality of band-pass filters to divided said first of said first plurality of subdivided frequency ranges into a second plurality of subdivided frequency ranges, a mixer circuit coupled to each of said second plurality of band-pass filters starting with the second of said second plurality of band-pass filters, an oscillator coupled to each of said mixer circuits, the frequency of the odd-numbered oscillators being disposed above its associated subdivided frequency range and the frequency of the even-numbered oscillators being disposed below its associated subdivided frequency range, each of the mixer circuit and oscillator coupled to a band-pass filter cooperating to translate their associated subdivided frequency range to the first of said second plurality of subdivided frequency ranges, a predetermined number of successive pluralities of band-pass filters for dividing the first subdivided frequency range of each preceding plurality of band-pass filters into a plurality of subdivided frequency ranges, a mixer circuit coupled to each of the plurality of band-pass filters starting with the second of the plurality of band-pass filters, and an oscillator coupled to each of the mixer circuits, the frequency of the odd-numbered oscillators being disposed above its associated subdivided frequency range and the frequency of the even-numbered oscillators being disposed below its associated subdivided frequency range, each of the mixer circuit and oscillator coupled to a band-pass filter cooperating to translate their associated subdivided frequency range to the first of the plurality of subdivided frequency ranges, and means for detecting the presence or absence of said signal wave in each of said subdivided frequency ranges to provide a digital indication representing the frequency of said signal wave.

13. A system for obtaining an indication representing the frequency of a signal wave in a given frequency range comprising a signal wave input, a first pair of band-pass filters to divide said given frequency range into a first pair of subdivided frequency ranges, a mixer circuit coupled to the second band-pass filter of said first pair of band-pass filters, an oscillator coupled to said mixer circuit, the frequency of said oscillator being disposed above the second of said first pair of subdivided frequency ranges, said mixer circuit and said oscillator cooperating to translate said second of said first pair of subdivided frequency ranges to the first of said first pair of subdivided frequency ranges, a second pair of band-pass filters to divide said first of said first pair of subdivided frequency ranges into a second pair of subdivided frequency ranges, a mixer circuit coupled to to the second band-pass filter of said second pair of band-pass filters, an oscillator coupled to said last-mentioned mixer circuit, the frequency of said last-mentioned oscillator being disposed above the second of said second pair of subdivided frequency ranges, said last-mentioned oscillator and said last-mentioned mixer circuit cooperating to translate said second of said second pair of subdivided frequency ranges to the first of said second pair of subdivided frequency ranges, a predetermined number of successive pairs of band-pass filters for dividing the first subdivided frequency range of each preceding pair of band-pass filters into a pair of subdivided frequency ranges, a mixer circuit coupled to the second band-pass filter of the pair of band-pass filters, and an oscillator coupled to the mixer circuit, the frequency of the oscillator being above the second of the pair of subdivided frequency ranges, the mixer and oscillator cooperating to translate the second of the pair of subdivided frequency ranges to the first of the pair of subdivided frequency ranges, and means for detecting the presence or absence of said signal wave in each of said subdivided frequency ranges to provide a reflected binary indication representing the frequency of said signal wave.

14. A system for obtaining an indication representing the frequency of a signal wave in a given frequency range comprising a signal wave input, a first group of four band-pass filters to divide said given frequency range into a first group of four subdivided frequency ranges, a mixer circuit coupled to the second, third and fourth band-pass filters of said first group of filters, an oscillator coupled to each of said mixer circuits, the frequency of the oscillators associated with the second and fourth band-pass filters of said first group of filters being disposed above their associated subdivided frequency range and the frequency of the oscillator associated with the third band-pass filter of said first group of filters being disposed below its associated subdivided frequency range, each of the mixer circuits and oscillators coupled to a band-pass filter cooperating to translate their associated subdivided frequency range to the first subdivided frequency range of said first group of subdivided frequency ranges, a second group of four band-pass filters to divide said first subdivided frequency range of said first group of subdivided frequency ranges into a second group of four subdivided frequency ranges, a mixer circuit coupled to the second, third and fourth band-pass filters of said second group of filters, an oscillator coupled to each of said mixer circuits, the frequency of the oscillators associated with the second and fourth band-pass filters of said second group of filters being disposed above their associated subdivided frequency range and the frequency of the oscillator associated with the third band-pass filter of said second group of filters being disposed below its associated subdivided frequency range, each of the mixer circuits and oscillators coupled to a band-pass filter cooperating to translate their associated subdivided frequency range to the first subdivided frequency range of said second group of subdivided frequency ranges, a predetermined number of successive groups of four band-pass filters for dividing the first subdivided frequency range of each preceding group of four band-pass filters into a group of four subdivided frequency ranges, a mixer circuit coupled to the second, third and fourth band-pass filters of the group of filters, an oscillator coupled to each of said mixer circuits, the frequency of the oscillators associated with the second and fourth band-pass filters of the group of filters being disposed above their associated subdivided frequency range and the frequency of the oscillator associated with the third band-pass filter of the group of filters being disposed below its associated subdivided frequency range, each of the mixer circuits and oscillators coupled to a band-pass filter cooperating to translate their associated subdivided frequency range to the first subdivided frequency range of the group of subdivided frequency ranges, and means for detecting the presence or absence of said signal wave in each of said subdivided frequency ranges to provide a digital indication representing the frequency of said signal wave.

15. A system for obtaining an indication representing the frequency of a signal wave in a given frequency range comprising a signal wave input means, a plurality of frequency responsive networks coupled in cascade to said input means, the first of said networks being responsive to the frequencies of said given frequency range and the others of said networks being responsive to the frequencies in a frequency range related to said given frequency range by different factors, each of said networks including a plurality of circuit means to divide the frequency range of said network into a given plurality of continuous frequency segments, said circuit means, except said circuit means providing the first of said frequency segments, including means to translate the frequency segment associated therewith to said first of said frequency segments, the frequency range of said others of said networks being said first of said frequency segments of the preceding one of said networks, and means coupled to each of said networks to provide an indication representing the frequency of said signal wave.

16. A system for obtaining an indication representing the frequency of a signal wave in a given frequency range comprising a signal wave input means, a plurality of frequency responsive networks coupled in cascade to said input means, the first of said networks being responsive to the frequencies of said given frequency range and the others of said networks being responsive to the frequencies in a frequency range related to said given frequency range by different factors, each of said networks including first and second circuit means to divide the frequency range of said network into first and second continuous frequency segments, said second circuit means further including heterodyning means to translate said second frequency segment to said first frequency segment, the frequency range of said others of said networks being said first frequency segment of the preceding one of said networks, and means coupled to each of said networks to provide binary type indication representing the frequency of said signal wave.

17. A system for obtaining an indication representing the frequency of a signal wave in a given frequency range comprising a signal wave input means, a plurality of frequency responsive networks coupled in cascade to said input means, the first of said networks being responsive to the frequencies of said given frequency range and the others of said networks being responsive to the frequencies in a frequency range related to said given frequency range by different factors, each of said networks including four circuit means to divide the frequency range of said network into four continuous frequency segments, said circuit means, except said circuit means providing the first of said frequency segments, including heterodyning means to translate the frequency segment associated therewith to said first of said frequency segments, the frequency range of said others of said networks being said first of said frequency segments of the preceding one of said network, and means coupled to each of said networks to provide a digital indication representing the frequency of said signal wave.

18. A system for obtaining an indication representing the frequency of a signal wave in a given frequency range comprising a signal wave input means, a plurality of frequency responsive networks coupled in cascade to said input means, the first of said networks being responsive to the frequencies of said given frequency range and the others of said networks being responsive to the frequencies in a frequency range related to said given frequency range by different factors, each of said networks including a plurality of band-pass filters to divide the frequency range of said network into a given plurality of continuous frequency segments, a mixer circuit coupled to each of said filters except the filter providing the first of said frequency segments, and an oscillator coupled to each of said mixer circuits, the frequency of said oscillators associated with even-numbered ones of said filters being disposed above the frequency segment associated therewith and the frequency of said oscillators associated with odd-numbered ones of said filters being disposed below the frequency segment associated therewith, each of said mixer circuits and said oscillators cooperating to translate the frequency segment associated therewith to said first of said frequency segments, the frequency range of said others of said networks being said first of said segments of the preceding one of said networks, and means coupled to each of said networks to provide a digital indication representing the frequency of said signal wave.

19. A system for obtaining an indication representing the frequency of a signal wave in a given frequency range comprising a signal wave input means, a plurality of frequency responsive networks coupled in cascade to said input means, the first of said networks being responsive to the frequencies of said given frequency range and the others of said networks being responsive to the frequencies in a frequency range related to said given frequency range by different factors, each of said networks including first and second band-pass filters to divide the frequency range of said network into first and second continuous frequency segments, a mixer circuit coupled to said second filter, and an oscillator coupled to said mixer circuit, the frequency of said oscillator being disposed above said second frequency segment, said mixer circuit and said oscillator cooperating to translate said second frequency segment to said first frequency segment, the frequency range of said others of said networks being said first frequency segment of the preceding one of said networks, and means coupled to each of said networks to provide a reflected binary indication representing the frequency of said signal wave.

20. A system for obtaining an indication representing the frequency of a signal wave in a given frequency range comprising a signal wave input means, a plurality of frequency responsive networks coupled in cascade to said input means, the first of said networks being responsive to the frequencies of said given frequency range and the others of said networks being responsive to the frequencies in a frequency range related to said given frequency range by different factors, each of said networks including first, second, third and fourth band-pass filters to divide the frequency range of said network into first, second, third and fourth continuous frequency segments, a mixer circuit coupled to each of said second, third and fourth filters, and an oscillator coupled to each of said mixer circuits, the frequency of the oscillator associated with said second and fourth filters being disposed above their associated frequency segments and the frequency of the oscillator associated with said third filter being disposed below its associated frequency segment, each of said mixer circuits and said oscillators cooperating to translate the frequency segment associated therewith to said first frequency segment, the frequency range of said others of said networks being said first frequency segment of the preceding one of said networks, and means coupled to each of said networks to provide a digital indication representing the frequency of said signal wave.

References Cited in the file of this patent

UNITED STATES PATENTS

| | | |
|---|---|---|
| 1,919,803 | Roetken | July 25, 1933 |
| 2,501,154 | Berman | Mar. 21, 1950 |
| 2,525,679 | Hurvitz | Oct. 10, 1950 |
| 2,683,869 | Norris et al. | July 13, 1954 |
| 2,840,709 | Blankenbaker | June 24, 1958 |